(12) United States Patent
Russell

(10) Patent No.: US 7,571,549 B1
(45) Date of Patent: Aug. 11, 2009

(54) SINE BAR ASSEMBLY WITH VERTICALLY FIXED PIVOT AXIS

(76) Inventor: Donald A. Russell, 1017 Ruth Ave., Erie, PA (US) 16509

( * ) Notice: Subject to any disclaimer, the term of this patent is extended or adjusted under 35 U.S.C. 154(b) by 62 days.

(21) Appl. No.: 11/890,173

(22) Filed: Aug. 3, 2007

(51) Int. Cl.
*G01B 3/56* (2006.01)

(52) U.S. Cl. ........................................ 33/538

(58) Field of Classification Search ........... 33/1 N, 33/471, 534, 535, 536, 537, 538, 567
See application file for complete search history.

(56) References Cited

U.S. PATENT DOCUMENTS

| | | | | |
|---|---|---|---|---|
| 2,365,436 A | * | 12/1944 | Saucier | 269/69 |
| 3,200,503 A | * | 8/1965 | Gutknecht | 33/536 |
| 3,432,934 A | * | 3/1969 | Schmidt | 33/538 |
| 3,820,247 A | * | 6/1974 | Casey et al. | 33/537 |
| 3,862,498 A | * | 1/1975 | Klucznik | 33/538 |
| 4,238,888 A | * | 12/1980 | Goldsmith | 33/538 |
| 4,398,349 A | * | 8/1983 | Bailey | 33/537 |
| 4,586,266 A | * | 5/1986 | Leumann | 33/531 |
| 4,660,293 A | * | 4/1987 | Kovacs | 33/471 |
| 4,744,152 A | * | 5/1988 | Roach et al. | 33/471 |

* cited by examiner

*Primary Examiner*—R. A. Smith
(74) *Attorney, Agent, or Firm*—Richard K Thomson

(57) ABSTRACT

An L-shaped sine plate is mounted to pivot about an arcuately translating pivot point to maintain the sharp corner height at a constant elevation. In this way, no mathematical formulae need be used to calculate adjustments which would otherwise be necessary if the sharp corner height was changing, as is the case with other sine bars.

1 Claim, 3 Drawing Sheets

SINE BAR ASSEMBLY WITH VERTICALLY FIXED PIVOT AXIS

BACKGROUND AND SUMMARY OF THE INVENTION

The present invention is directed to the field of machining. More particularly, a sine bar with a fixed pivot axis which eliminates the need for complex mathematical calculations/use of trig tables to compute a sharp corner height when machining and measuring parts.

Existing sine bars used to measure the sharp corner height when machining/checking a part, pivot about an axis that changes elevation and requires the use of complicated mathematical formulae of look up tables to adjust for this elevational change. Such calculations slow the machining process and, depending on the level of mathematical acuity and alertness of the machinist, can result in machining errors leading to significant increases in scrap parts.

The present invention introduces an improved sine bar assembly in which the pivot axis of the sine plate remains fixed and obviates the use of trig formulae/look up tables. The sine bar assembly of the present invention comprises a) a base plate; b) an L-shaped sine plate with a pivot axis in the region of a juncture formed by a first laterally extending arm and a second vertically extending arm; c) mounting means for supporting the L-shaped sine plate enabling the sine plate to pivot about the pivot axis; whereby the pivot axis remains at a fixed height and mathematical calculations necessary to determine a sharp corner height for other sine bars are obviated. Preferably, the sine bar has a smooth radiused surface on an outside of the juncture between the first arm and the second arm. The mounting means preferably includes first and second side plates, each side plate having at least one first opening facilitating attachment of the side plate to the base plate and at least one second opening for receiving a fastener which serves as an axle about which the sine bar pivots. The second opening in each side plate is kidney shaped defining a smooth arc with a radius generally equal to a radius forming the smooth arcuate surface on the L-shaped arm.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
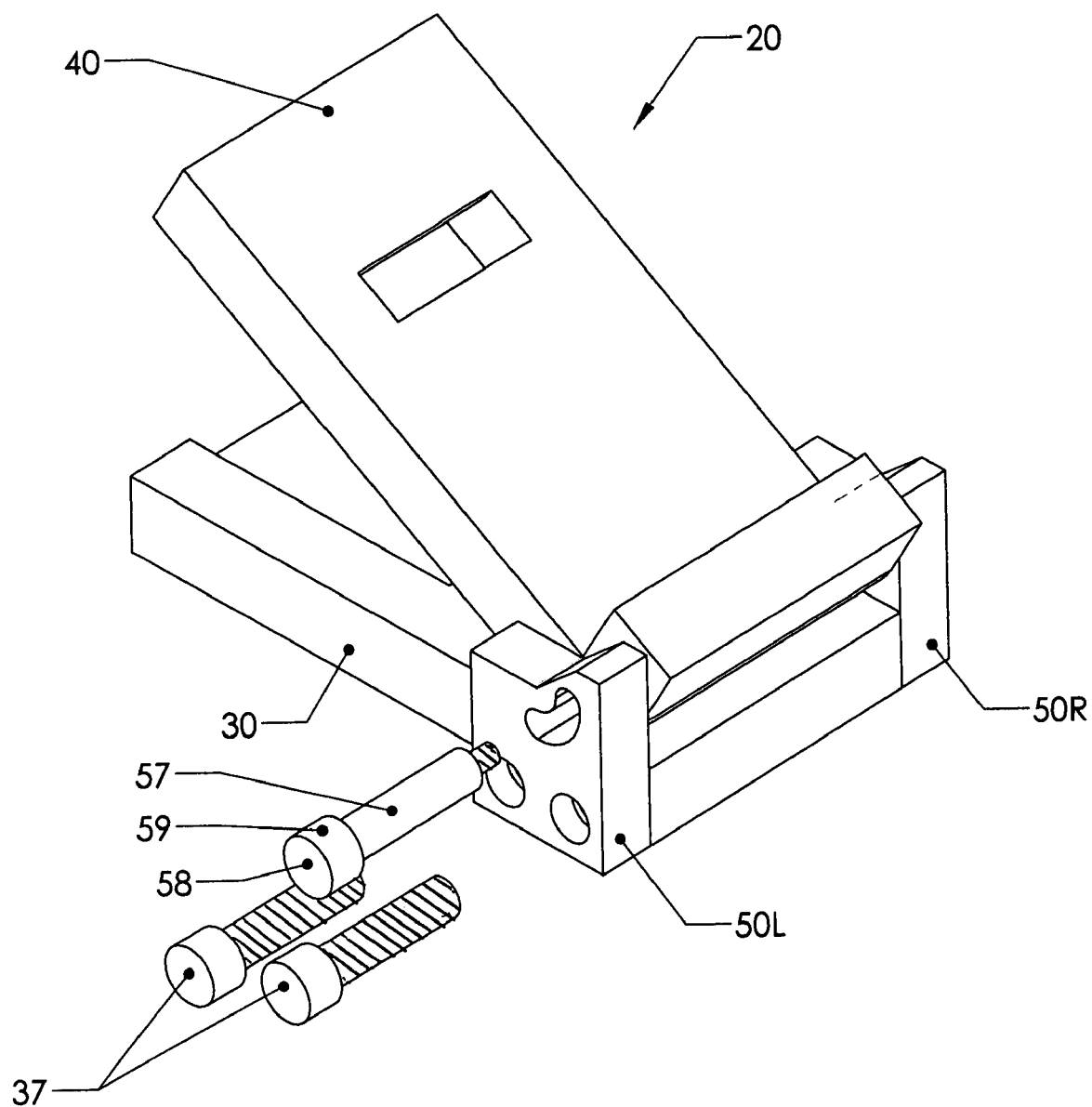
FIG. 1 is a side perspective front view of a first embodiment of the sine plate assembly of the present invention.
Figure 2:
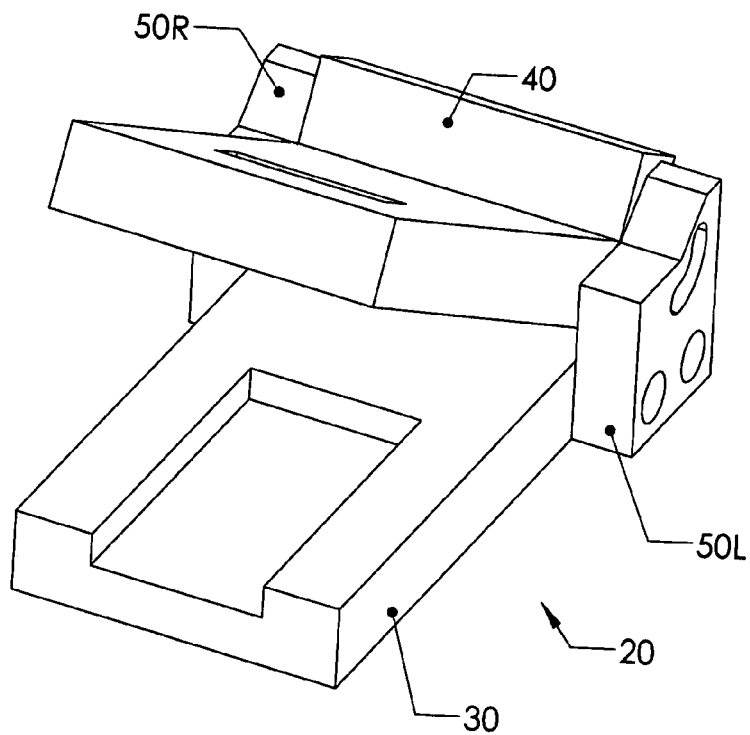
FIG. 2 is a front perspective front view of a first embodiment.

A first embodiment of the sine bar assembly of the present invention is depicted in FIGS. 1 and 2 generally at 20. Sine bar assembly 20 comprises a base (or support) plate 30, an L-shaped sine plate 40 and left and right side plates 50L and 50R, respectively.

Figure 3:
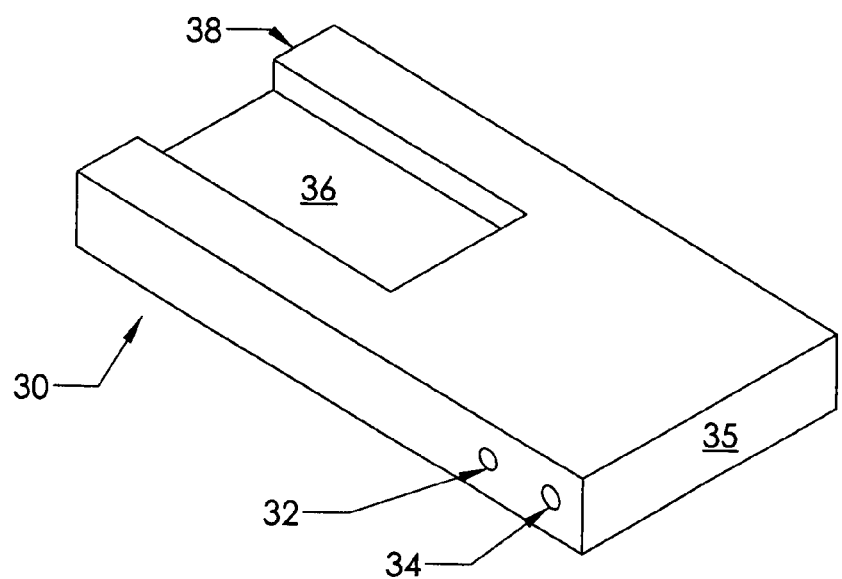
FIG. 3 is a front perspective view of the base plate used in first embodiment.

As best seen in FIG. 3, base plate 30 is a generally rectangular plate having a pair of threaded bores 32, 34 on each side adjacent proximate end 35 to accommodate cap screws 37 (FIG. 1) for attachment of side plates 50L and 50R to each side. A rectangular recess 36 is formed adjacent the distal end 38 which minimizes the contact area between sine plate 40 and base plate 30 facilitating rotation of sine plate 40.

Figure 4:
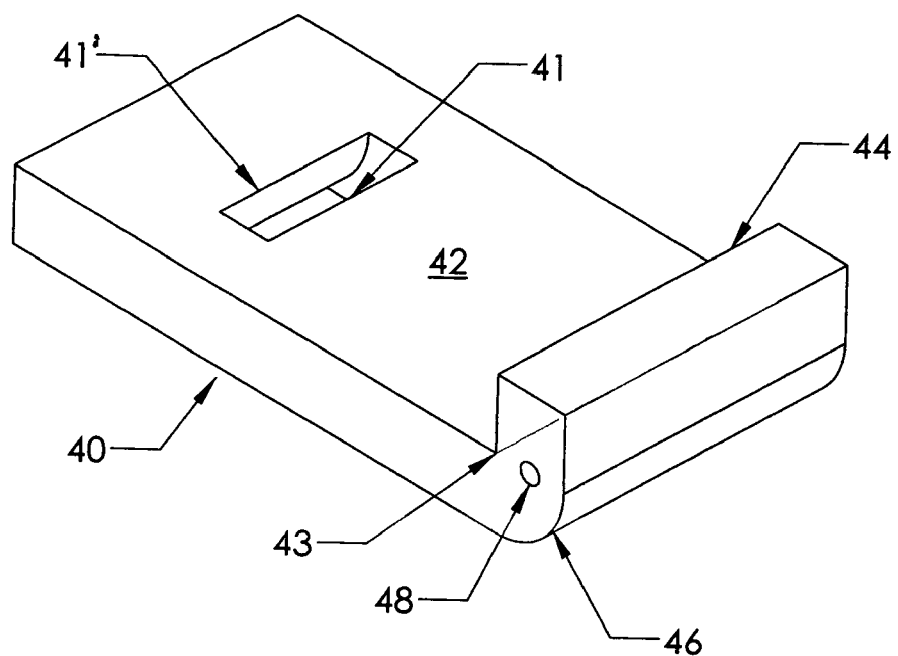
FIG. 4 is a front perspective view of the sine plate of the first embodiment; and, FIG. 5 is a front perspective view of the left pivot arm of the first embodiment.

Referring now to FIG. 4, L-shaped sine plate 40 has a first laterally extending arm 42 and a second vertically extending arm 44 which form sharp corner 43 at their juncture. Sharp corner 43 defines the sharp corner height from which measurements are taken in machining operations. The fact that the sharp corner height of the sine plate assembly 20 remains unchanged is a critical advantage of the present invention. This makes it unnecessary to use the trigonometric formulae or look up tables to adjust the apparent height to the actual height, due to the vertical displacement of the sharp corner height, as occurs with other sine bars. A smooth radius 46 is formed on the exterior surface of sine plate 40 extending between laterally extending arm 42 and vertically extending arm 44. A threaded bore 48 is carefully positioned such that its centerline aligns with the upper surface of laterally extending arm 42. As is customary, a notch 41 having a radius 41' is formed in laterally extending arm 42 to receive a stack of gage blocks (not shown) to position sine plate 40 at the desired angle. It will be appreciated that notch 41 need not, and preferably does not, extend all the way through the sine plate 40. It is important that the radius 41' match the radius 46 at the juncture of arms 42 and 44.

Figure 5:
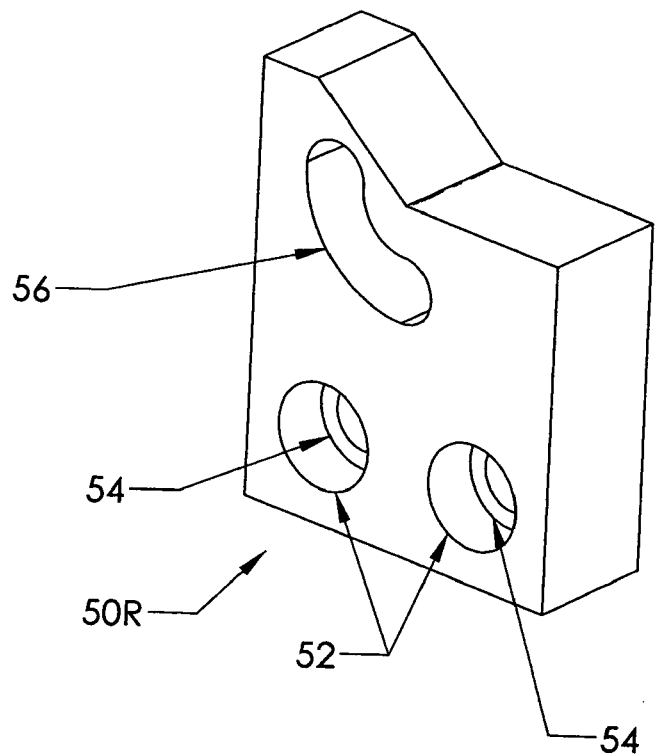

Turning attention to FIG. 5, side plate 50R is shown. Side plate 50L is a mirror image of side plate 50R and accordingly, description of the former will be understood to mirror the latter. Side plate 50R serves as a pivot arm for L-shaped sine plate 40. Counterbored holes 52 have a shoulder 54 formed therein in which the head of cap screws 37 which thread into threaded bores 32,34 in base plate 30. Kidney shaped through bore 56 permits the shank 57 of shoulder bolt 58 which serve as the pivot axis for L-shaped sine plate 40 to float as laterally extending arm 42 is rotated from a horizontal position toward a vertical position. Head portion 59 of shoulder bolt 58 is tightened against the side of side plate 50R to provide some frictional resistance to its movement to better allow it to be positioned as desired. It is this floating of the pivot axis, in conjunction with the proper choice of dimensions for the component elements, which permits the sharp corner height to remain unchanged.

Actual us of the sine bar assembly 20 is depicted in FIGS. 1 and 2. A part to be machined is placed in L-shaped sine plate 40 with one of its sides adjacent vertical arm 44. L-shaped sine plate 40 is then rotated about fasteners 58 which translate along the arcuate path defined by kidney shaped through bore 56 maintaining the juncture of arms 42, 44 at a constant elevation such that no adjustment need be made in the sharp corner height when marking a part for machining or when checking the part following the cutting.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A sine bar assembly having a sine plate with a sharp corner height which remains at a fixed height, said sine bar assembly comprising a) a base plate;

b) an L-shaped sine plate with a pivot axis in the region of a juncture formed by a first laterally extending arm and a second vertically extending arm, said juncture defining a sharp corner height, said L-shaped sine plate having a smooth radiused surface on an outside of said juncture between said first arm and said second arm;

c) mounting means for supporting said L-shaped sine plate enabling said sine plate to pivot about said pivot axis, said mounting means including first and second side plates, each said side plate having at least one first opening facilitating attachment of said side plate to said base plate and at least one second opening for receiving a fastener which serves as an axle about which said sine bar pivots, wherein each said second opening in said first and second side plate is kidney shaped defining a smooth arc with a radius generally equal to a radius forming said smooth arcuate surface on said L-shaped arm;

whereby said sharp corner height remains at a fixed height and mathematical calculations necessary to determine said sharp corner height for other sine bars are obviated.

* * * * *